(12) United States Patent
Chai et al.

(10) Patent No.: US 9,385,913 B2
(45) Date of Patent: *Jul. 5, 2016

(54) METHOD AND SYSTEM FOR SHARING DIGITAL MEDIA CONTENT

(71) Applicant: OpenTV, Inc., San Francisco, CA (US)

(72) Inventors: Crx K. Chai, Oakland, CA (US); Alex Fishman, San Francisco, CA (US)

(73) Assignee: OpenTV, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/083,000

(22) Filed: Nov. 18, 2013

(65) Prior Publication Data

US 2014/0075040 A1 Mar. 13, 2014

Related U.S. Application Data

(63) Continuation of application No. 12/878,901, filed on Sep. 9, 2010, now Pat. No. 8,606,848.

(60) Provisional application No. 61/241,276, filed on Sep. 10, 2009.

(51) Int. Cl.
*G06F 15/16* (2006.01)
*G06F 15/173* (2006.01)
*H04L 29/06* (2006.01)
*G06F 17/30* (2006.01)

(52) U.S. Cl.
CPC ...... *H04L 29/06176* (2013.01); *G06F 17/3002* (2013.01); *G06F 17/30044* (2013.01)

(58) Field of Classification Search
CPC .................................................. H04L 29/06176
See application file for complete search history.

(56) References Cited

U.S. PATENT DOCUMENTS

| 8,051,130 | B2* | 11/2011 | Logan et al. ................. 709/204 |
| 8,065,604 | B2 | 11/2011 | Blankinship |
| 8,606,848 | B2 | 12/2013 | Chai et al. |
| 2002/0120925 | A1* | 8/2002 | Logan ............................. 725/9 |
| 2002/0162118 | A1 | 10/2002 | Levy et al. |

(Continued)

FOREIGN PATENT DOCUMENTS

| CN | 102782609 A | 11/2012 |
| JP | 11032070 A | 2/1999 |

(Continued)

OTHER PUBLICATIONS

"U.S. Appl. No. 12/878,901, Corrected Notice of Allowance mailed Sep. 30, 2013", 6 pgs.

(Continued)

*Primary Examiner* — Karen Tang
(74) *Attorney, Agent, or Firm* — Schwegman Lundberg & Woessner, P.A.

(57) ABSTRACT

Methods and systems for generating and sharing media clips are described. Consistent with some embodiments, while a selection of digital media content (e.g., a movie, television program, audio track, and so on) is being presented at a media player, a user creates one or more sets of waypoints (e.g., time markers) that define the boundaries (e.g., beginning and end) of one or more media clips. These waypoints are communicated from one media player device to another, enabling the receiving media player device to retrieve and play back the media clips from a source other than the media player device where the waypoints were generated.

16 Claims, 9 Drawing Sheets

(56) References Cited

U.S. PATENT DOCUMENTS

| | | | |
|---|---|---|---|
| 2003/0093790 A1* | 5/2003 | Logan et al. | 725/38 |
| 2004/0125148 A1 | 7/2004 | Pea et al. | |
| 2006/0149781 A1 | 7/2006 | Blankinship | |
| 2006/0218579 A1 | 9/2006 | Logan et al. | |
| 2006/0277453 A1 | 12/2006 | Smith et al. | |
| 2007/0033528 A1* | 2/2007 | Merril et al. | 715/732 |
| 2007/0168543 A1 | 7/2007 | Krikorian et al. | |
| 2007/0174774 A1* | 7/2007 | Lerman et al. | 715/723 |
| 2007/0183741 A1* | 8/2007 | Lerman et al. | 386/54 |
| 2007/0206832 A1 | 9/2007 | Gordon et al. | |
| 2007/0209005 A1 | 9/2007 | Shaver et al. | |
| 2007/0250874 A1 | 10/2007 | Howcroft | |
| 2008/0040444 A1 | 2/2008 | Angquist et al. | |
| 2008/0066743 A1 | 3/2008 | Grychowski et al. | |
| 2008/0086743 A1 | 4/2008 | Cheng et al. | |
| 2008/0155059 A1 | 6/2008 | Hardin et al. | |
| 2008/0313541 A1 | 12/2008 | Shafton et al. | |
| 2009/0019374 A1* | 1/2009 | Logan et al. | 715/753 |
| 2009/0022362 A1* | 1/2009 | Gagvani | G06T 7/2053 382/100 |
| 2009/0049495 A1 | 2/2009 | Ketterling et al. | |
| 2009/0158318 A1 | 6/2009 | Levy | |
| 2009/0199230 A1 | 8/2009 | Kumar et al. | |
| 2009/0248182 A1 | 10/2009 | Logan et al. | |
| 2009/0288110 A1* | 11/2009 | Logan et al. | 725/24 |
| 2010/0158109 A1 | 6/2010 | Dahlby et al. | |
| 2010/0242074 A1 | 9/2010 | Rouse et al. | |
| 2011/0106910 A1 | 5/2011 | Grasset | |
| 2013/0263285 A1* | 10/2013 | Lester et al. | 726/28 |

FOREIGN PATENT DOCUMENTS

| | | | |
|---|---|---|---|
| JP | 2003085207 A | 3/2003 | |
| JP | 2006065975 A | 3/2006 | |
| JP | 2007234090 A | 9/2007 | |
| JP | 2009111530 A | 5/2009 | |
| JP | 5798559 B2 | 8/2015 | |
| WO | WO-2011031994 A1 | 3/2011 | |

OTHER PUBLICATIONS

"U.S. Appl. No. 12/878,901, Examiner Interview Summary mailed Feb. 21, 2013", 3 pgs.
"U.S. Appl. No. 12/878,901, Final Office Action mailed Sep. 13, 2012", 9 pgs.
"U.S. Appl. No. 12/878,901, Non Final Office Action mailed Feb. 1, 2012", 14 pgs.
"U.S. Appl. No. 12/878,901, Notice of Allowance mailed Aug. 7, 2013", 8 pgs.
"U.S. Appl. No. 12/878,901, Response filed Feb. 13, 2013 to Final Office Action mailed Sep. 13, 2012", 10 pgs.
"U.S. Appl. No. 12/878,901, Response filed Jul. 2, 2012 to Non Final Office Action mailed Feb. 1, 2012", 9 pgs.
"International Application Serial No. PCT/US2010/048462, Search Report mailedOct. 18, 2010", 11 pgs.
"International Application Serial No. PCT/US2010/048462, Written Opinion mailed Oct. 18, 2010", 11 pgs.
"International Application Serial No. PCT/US2010/48462, International Preliminary Report on Patentability mailed Jun. 6, 2012", 17 pgs.
"Japanese Application Serial No. 2012-528932, Written Submission of Evidence filed on Oct. 10, 2012 to Notification to File mailed on Sep. 25, 2012", 17 pgs.
"Chinese Application Serial No. 201080047201.7, Office Action mailed May 12, 2015", 6 pgs.
"Chinese Application Serial No. 201080047201.7, Office Action mailed Nov. 19, 2015", With English translation, 6 pgs.
"Chinese Application Serial No. 201080047201.7, Response filed Jul. 23, 2015 to Office Action mailed May 12, 2015", 7 pgs.
"Japanese Application Serial No. 2012-528932, Office Action mailed Jul. 28, 2015", 6 pgs.
"Japanese Application Serial No. 2012-528932, Response filed Apr. 9, 2015 to Office Action mailed Jan. 13, 2015", 8 pgs.
"Japanese Application Serial No. 2012-528932, Response filed Jul. 31, 2014 to Office Action mailed May 7, 2014", 6 pgs.
"Australian Application Serial No. 2010292131, Response filed Oct. 2, 2014", 25 pgs.
"Chinese Application Serial No. 201080047201.7, Response filed Jan. 20, 2015", with English translation of claims, 11 pgs.
"Japanese Application Serial No. 2012-528932, Office Action mailed Jan. 13, 2015", with English translation of claims, 8 pgs.
"Chinese Application Serial No. 201080047201.7, Office Action mailed Sep. 21, 2014", 10 pgs.
"U.S. Appl. No. 12/878,901, Applicant Interview Summary filed Oct. 31, 2013", 1 pg.
"Australian Application Serial No. 2010292131, First Examiner Report mailed Apr. 4, 2014", 3 pgs.
"Chinese Application Serial No. 201080047201.7, Voluntary Amendment filed Mar. 22, 2013", with English translation of claims, 7 pgs.
"International Application Serial No. PCT/US2010/0488462, Response filed Jul. 8, 2011 to Written Opinion mailed Oct. 18, 2010", 6 pgs.
"Japanese Application Serial No. 2012-528932, Office Action mailed May 7, 2014", with English translation of claims, 6 pgs.
"Russian Federation Application Serial No. 2012112355, Office Action mailed Feb. 24, 2015", with English translation of claims, 9 pgs.

* cited by examiner

METHOD AND SYSTEM FOR SHARING DIGITAL MEDIA CONTENT

RELATED APPLICATIONS

This patent application is a continuation of U.S. patent application Ser. No. 12/878,901, filed Sep. 9, 2010, which claims the benefit of priority to U.S. Provisional Patent Application Ser. No. 61/241,276, filed on Sep. 10, 2009, which applications are incorporated herein by reference in their entirety.

TECHNICAL FIELD

The present disclosure generally relates to digital media content systems and applications. More specifically, the present disclosure relates to methods and systems for sharing a portion (e.g., one or more media clips) of a particular selection of digital media content.

BACKGROUND

Despite significant improvements in computer networking technologies, audio and video broadcasting systems, and digital media player devices, it remains a challenge to share with another person a portion of a particular selection of digital media content. For example, when using a conventional media player device to listen to or view streaming digital media content, such as a movie, television program, news broadcast, sporting event, or user-generated program, a user may identify a particular portion of the content that the user would like to share with another person. A user may desire to share a single scene of a movie with another person, a particular news segment from a news program, or only those innings of a baseball game in which a particular team has scored a run. Most conventional media player devices do not have a mechanism that will allow a user to share a portion of digital media content—referred to herein as a media clip—with another person who is not present in time and location with the viewer.

Some media player devices provide the ability to record digital media content that is being streamed to, and presented at, the digital media player. However, these media player devices provide content recording capabilities primarily to enable time shifting—the recording of a program to a storage medium to be viewed or listened to at a time more convenient to the user. Most of the media player devices with content recording capabilities do not provide the ability to transfer the recorded digital media content to another device for play back at the other device.

Another class of media player devices enables a functionality that is commonly referred to as location shifting. Location shifting involves the redirection of a stream of digital media content from a first media player device to a second media player device. For example, in a typical use case, a set-top box receives digital content over a broadcast network (e.g., television or radio network) and redirects the received stream of digital content over a computer network (e.g., an Internet Protocol, or IP-based network) to a mobile or personal media player device, such as a mobile handset or notebook computer. For location shifting to work properly, the network connection between the first media player device and the second media player device needs a bandwidth and throughput rate sufficient to support the transfer of the digital media content in near real time. Given the size (e.g., quantity of data) of the computer files involved, particularly with digital content encoded in a high quality formats (e.g., high definition formats), location shifting is not always a viable option.

Some media player devices may have feature sets that enable both time and location shifting. For example, a stream of digital media content that has been previously recorded to a first media player device (e.g., a set-top box) might be accessible from a remote media player device, such that it can be streamed from the first media player device to the remote media player device at a time of the user's selecting. However, here again the network connection between the two devices must be sufficient to support near real time streaming of large computer files. Furthermore, with conventional time and location shifting devices, the user does not have a convenient way to share only certain portions (e.g., media clips) of a selection of digital media content.

DESCRIPTION OF THE DRAWINGS

Some embodiments are illustrated by way of example and not limitation in the figures of the accompanying drawings, in which.

DETAILED DESCRIPTION

Figure 1:
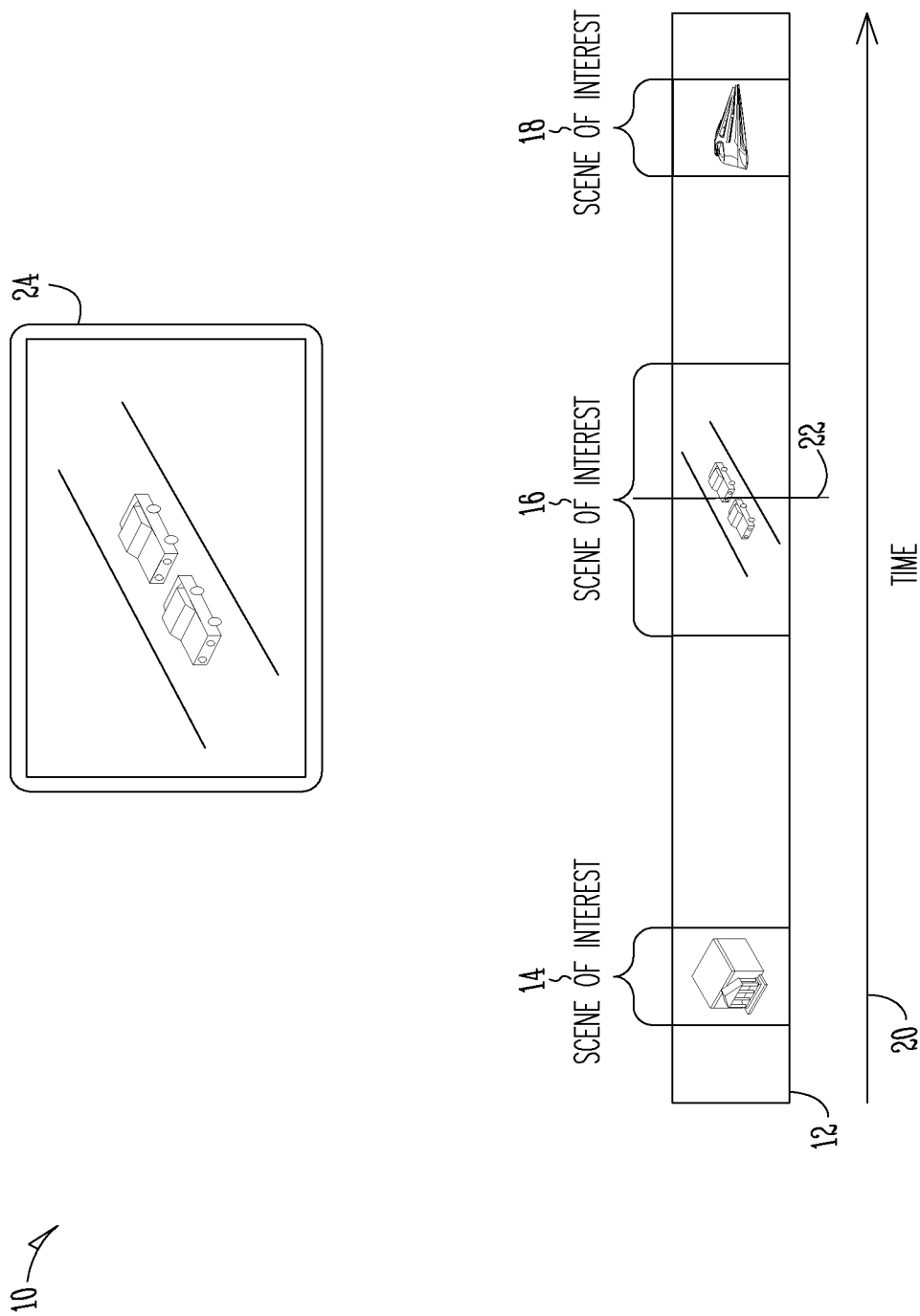
FIG. 1 illustrates an example of a time-line view of a graphical representation of a selection of digital media content, such as a movie, having several scenes of interest.

Methods and systems for sharing media clips are described. In the following description, for purposes of explanation, numerous specific details are set forth in order to provide a thorough understanding of the various aspects of different embodiments of the present invention. It will be evident, however, to one skilled in the art, that the present invention may be practiced without these specific details.

Consistent with some example embodiments, while digital media content is being streamed to, and/or presented at, a digital media player, a user who is viewing or listening to the digital media content can establish a pair of time markers that together define the beginning and ending boundaries of a portion of the digital media content being presented. A portion of digital media content identified by these time markers is referred to herein as a "video clip", "audio clip", "media clip", or simply a "clip". The time markers that define the boundaries (e.g., beginning and ending) of a clip are referred to herein collectively as "waypoints". More specifically, a waypoint representing the beginning boundary of a clip is referred to herein as an "in-point", while a waypoint representing the ending boundary of the clip is referred to herein as an "out-point". In the context of the present disclosure, a selection of digital media content is simply a single unit of media content, such as a movie title, a television program, a news program, a sporting event, a song, a class room lecture, a collection of home videos, and so on.

After a user has identified one or more pairs of waypoints, where each pair defines a media clip, the user can invoke a command directing the media player to communicate the waypoints to another media player (e.g., a target player). In some example embodiments, the waypoints will be communicated to the target player along with supporting meta-data. The supporting meta-data may, for example, identify various attributes or characteristics of the digital media content for which the waypoints have been generated. For instance, in some example embodiments, the meta-data may include a content identifier that indicates the specific digital media content (e.g., title and/or track) and version, or format, to which the waypoints relate. Additionally, the meta-data may include a content source identifier that identifies a content source where the selection of media content from which the media clips are generated can be accessed and streamed. In some example embodiments, the meta-data may include data representing a single frame from a video clip, which can be used as a "thumbnail" image as a graphical representation of the video clip in a user interface at the receiving (e.g., target) media player device. In some example embodiments, the meta-data may be part of the waypoints, and in some example embodiments, the meta-data may be stored separate from the waypoints. In any case, the combination of the waypoints and the supporting meta-data provide a target player with all of the information needed to request the digital media content from a content source, and then present the media clips as defined by the waypoints.

In some example embodiments, the target player, which has received the waypoints, will communicate a content request to a content source identified in the meta-data received with the waypoints. In some example embodiments, the content request communicated from the target player to the content source will include the waypoints, thereby making it possible for the content source to extract the media clips from the requested media content, and communicate only the data representing the media clips defined by the waypoints. In an alternative example embodiment, the content request communicated from the target player to the content source will not include the waypoints. In such an example embodiment, the target player will receive a complete version of the requested digital content, and will utilize the waypoints to extract the relevant media clips at the target player.

In various example embodiments, there may be a wide variety of mechanisms by which waypoints can be defined. For example, in a set-top box implementation, waypoints may be defined by simply pressing a button on a remote control device, such as a conventional infra-red remote control, or a virtual remote control application executing on a WiFi® connected mobile phone. For instance, a remote control device may have dedicated buttons (either "hard-wired" or programmable soft buttons) for defining waypoints (in-points, and/or out-points). In such an implementation, the set-top box may have a signal receiver for receiving a signal (e.g., infrared, radio frequency, Bluetooth or Wi-Fi) containing a command to establish a waypoint. The command, once received, is processed to establish the waypoint that identifies either a beginning or ending boundary for a media clip that corresponds to the media selection being presented at the time when the command was invoked. The data in the waypoint may be as simple as a time reference or offset, which identifies a particular temporal point in the content, relative to the very beginning of the content. In alternative example embodiments, the command that is processed to generate a waypoint may itself be generated in other ways. For example, with a portable media player implementation, the portable media player may have a dedicated button that, when pressed, invokes a command to define a waypoint. In some example embodiments, separate buttons may exist—one for in-points and one for out-points. In alternative example embodiments, a single button may be used for defining waypoints, such that the first time the button is pressed, an in-point is defined, and the second time the button is pressed, an out-point is defined. In yet another example, a media player device with a touch screen may have user interface (UI) buttons that can be presented on the touch screen display, such that, when pressed, the UI buttons enable the user to define the waypoints. Skilled artisans will readily recognize that there are a great number of alternative input mechanisms that might be used, consistent with alternative example embodiments, for invoking a command to generate a waypoint at the media player device presenting the digital media content.

Once generated, the waypoints can be communicated to another media player over a private or public, wired or wireless, communications network. The communications network over which the waypoints are communicated may be a conventional computer network, such as the Internet, or a proprietary network. In some example embodiments, a media player device may utilize a short range communications technology, such as Bluetooth, Near Field Communication (NFC) or Infrared, to communicate waypoints to other media player devices that are in relatively close range. For example, a user may have an archive of favorite media clips (defined by waypoints) stored on a mobile media player device (e.g., a mobile handset, tablet computer, personal media player, and so on). When the user is within range of another media player (e.g., a set-top box), the user may utilize a short range communication technology to transfer the waypoints defining one or more media clips to another media player. Because the media clips on the mobile media player device are stored as waypoints, the transfer occurs very quickly. Once the waypoints are received at the target media player device, the target media player can utilize the waypoints to extract the relevant media clip from a locally-stored copy of the selection of digital media content, or alternatively, utilize a different communications network to download the relevant content and display the content, as defined by the waypoints. Accordingly, with some embodiments, content may be streamed or downloaded from a remote content source, while in other example embodiments, previously downloaded and stored content may be processed to extract and playback only the portions defined by the waypoints. Other aspects of various example embodiments are presented in connection with the description of the figures that follow.

FIG. 1 illustrates an example of a time-line view 10 of a graphical representation of a selection of digital media content 12, such as a movie, having several scenes of interest 14, 16 and 18. For example, moving from left to right along the line with reference number 20 represents the passing of time. Similarly, moving from left to right along the graphical representation of the digital media content 12 coincides with the chronological order in which the digital media content is to be presented. Accordingly, the left most edge of the graphical representation of the media content represents, for example, the beginning of the content (e.g., the movie). The right most edge of the graphical representation of the content represents the end of the content.

In this example, there are three scenes of interest 14, 16 and 18 that a viewer would like to share with another person. As illustrated in FIG. 1, in the graphical representation of the digital media content 12, the three scenes of interest 14, 16 and 18 are depicted by a single still frame having a width that represents the length of time for the scene, relative to the length of time for the entire digital media content. In this example, the line with reference number 22 represents the currently displayed frame, and thus the current playback position of the digital media content. For instance, the line with reference number 22 corresponds with the image that is displayed in the example display 24.

Figure 2:
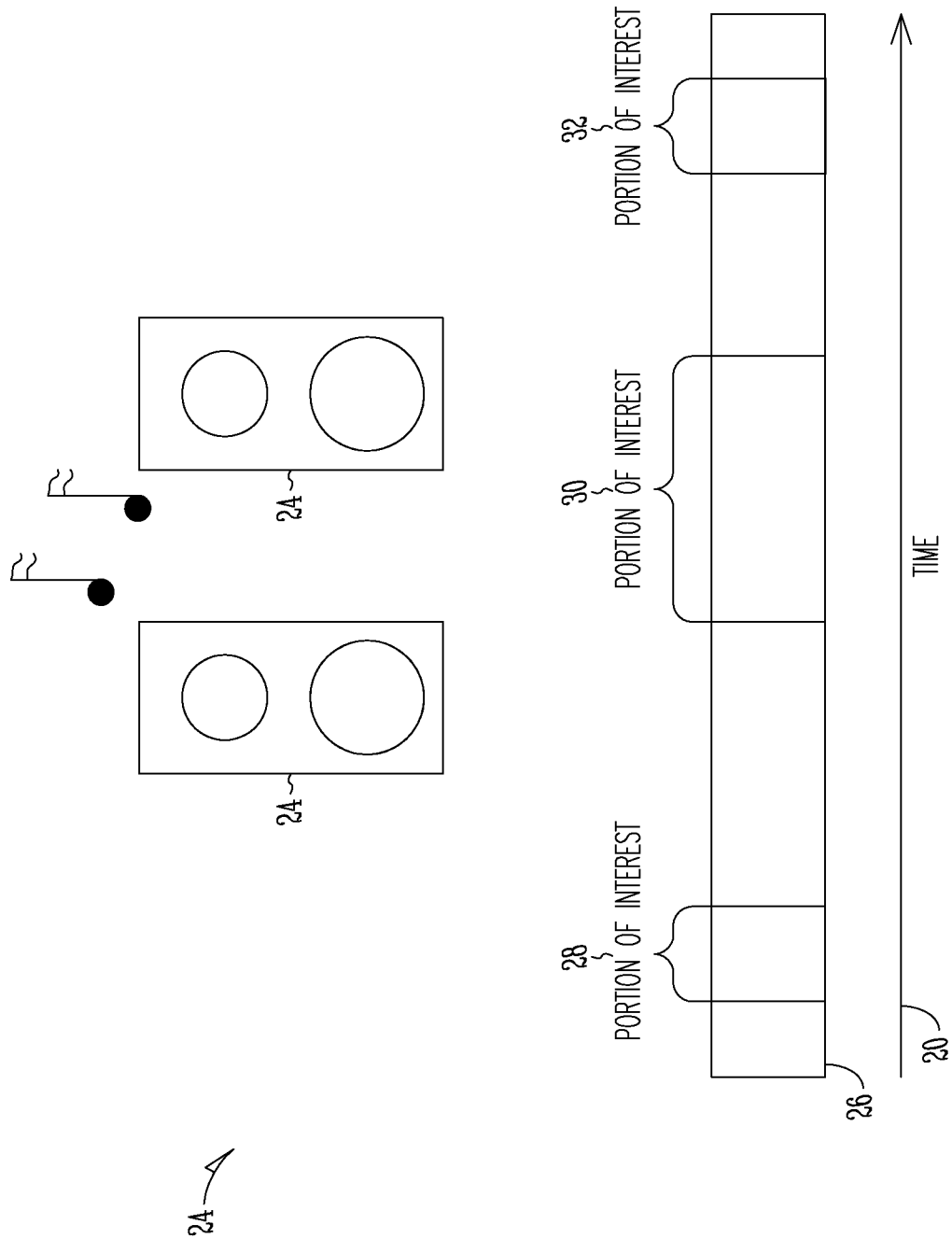
FIG. 2 illustrates an example of a time-line view of a graphical representation of a selection of digital audio content, such as a news program or class lecture, having several portions of interest.

Similar to FIG. 1, FIG. 2 illustrates an example time-line view 24 of a graphical representation of an audio track 26, having three distinct portions (e.g., portions 28, 30 and 32) that are of interest to a user. Similar to the graphical representation of the movie 12 depicted in FIG. 1, in FIG. 2, the audio track is graphically depicted as box 26 with three portions that are of interest to a listener of the audio track. In this example, the audio track plays back on a set of speakers 34. The audio track may be a song, a program (e.g., news program) recorded from a radio broadcast, a class room lecture, or any other audio recording. In this example, the three portions of interest 28, 30 and 32 are depicted by boxes having a width that represents the length of time for the respective portions of interest, relative to the length of time for the entire audio track.

Figure 3:
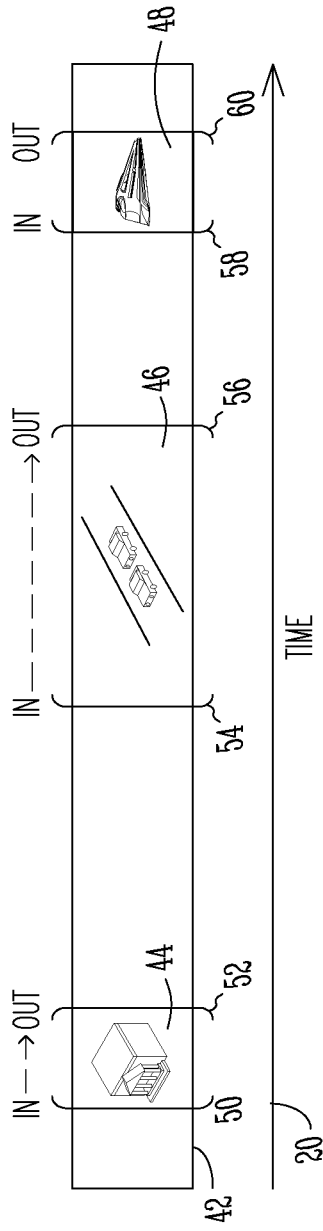
FIG. 3 illustrates an example of a time-line view of a graphical representation of a selection of digital media content including waypoints that define the boundaries for playing back three different media clips, according to an example embodiment.
Figure 3:
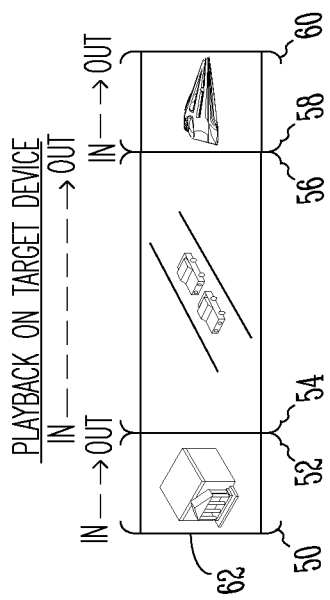

FIG. 3 illustrates an example of a time-line view 40 of a graphical representation of a selection of digital media content 42 (e.g., a movie) including waypoints that define the boundaries for playing back three different media clips 44, 46 and 48, according to an example embodiment. As shown in FIG. 3, the graphical representation of the media content 42 includes three clips 46, 48 and 50. The first clip 44 is defined by a pair of waypoints, including in-point 50 and out-point 52. The second clip 46 is defined by a second pair of waypoints, including in-point 54 and out-point 56. Finally, the third clip is defined by a pair of waypoints including in-point 58 and out-point 60. The three pairs of waypoints define three media clips from the same selection of digital media content 42.

In some example embodiments, the waypoints include, or are otherwise associated with, meta-data that, for example, may include a content identifier that identifies the selected digital media content (e.g., the movie, by title), the particular version or format of the digital content, and a content source identifier identifying a content source where the digital content can be accessed. With some example embodiments, the meta-data may also include a very short snippet (e.g. a frame, or few seconds of audio content) for use in presenting a sample of the media clips for selection at the target media player device. By communicating these waypoints and associated meta-data from a first media player device to a second (e.g., target) media player device, the target media player device is able to utilize the waypoints and corresponding meta-data to retrieve the relevant clips, and present the clips. Because the transfer of the waypoints involves only a very small amount of data, and not the data representing the actual media clips, the transfer from the first media player device to the second media player device occurs very quickly. The user who receives the waypoints at his or her target media player device can choose whether or not to play the media clips, and in some instances, select the particular content source from which to access the shared content. Consequently, in an example embodiment, the transfer of the data representing the actual media clips only occurs if the receiving user, with whom the media clips are being shared, chooses to play the media clips. This is in contrast with conventional media player devices that transfer the actual data representing the media clips from a first media player device to a second media player device, irrespective of whether the receiving user has any desire to play the media clips.

In FIG. 3, the combined media clips are graphically represented by the rectangle with reference number 62. As described in detail below, in some example embodiments the target device utilizes the waypoint pairs to extract the relevant media clips from a stream of the digital media content. For example, with some example embodiments, the digital content is processed at the target device (e.g., the set top box that has received the waypoints and related metadata), such that the relevant media clips are extracted from the digital content as defined by the waypoints. In other example embodiments, the waypoint pairs may be communicated to a content source, and processed at the content source, such that only the relevant data representing the media clips defined by the waypoint pairs are communicated from the content source to the target media player device. Advantageously, by communicating the waypoints to the content source, the content source need not transmit the entire selection of digital content, but instead can transmit only the media clips extracted from the selected digital media content in accordance with the waypoints, thereby preserving network bandwidth.

Consistent with some example embodiments, when a user's media player is presenting a selection of digital media content, the user manipulates one or more control mechanisms (e.g., buttons) to establish waypoint pairs that define a media clip. The user interface of the media player device facilities the selection of multiple media clips, which can be concatenated together in an order selected by the user. With some embodiments, a user may be able to define scene, track or clip transitions—such as various sound or visual effects. Furthermore, with some embodiments, the user who has generated the media clips may select one or more sources from which the content can be accessed, such that a content source identifier is communicated to the target media player for each content source from which the content can be accessed. This enables the receiving user with whom the clips have been shared to select a content source of his or her choosing. If, for example, the receiving user subscribes to a particular content source, the receiving user may select that content source for accessing the shared media clips.

Figure 4:
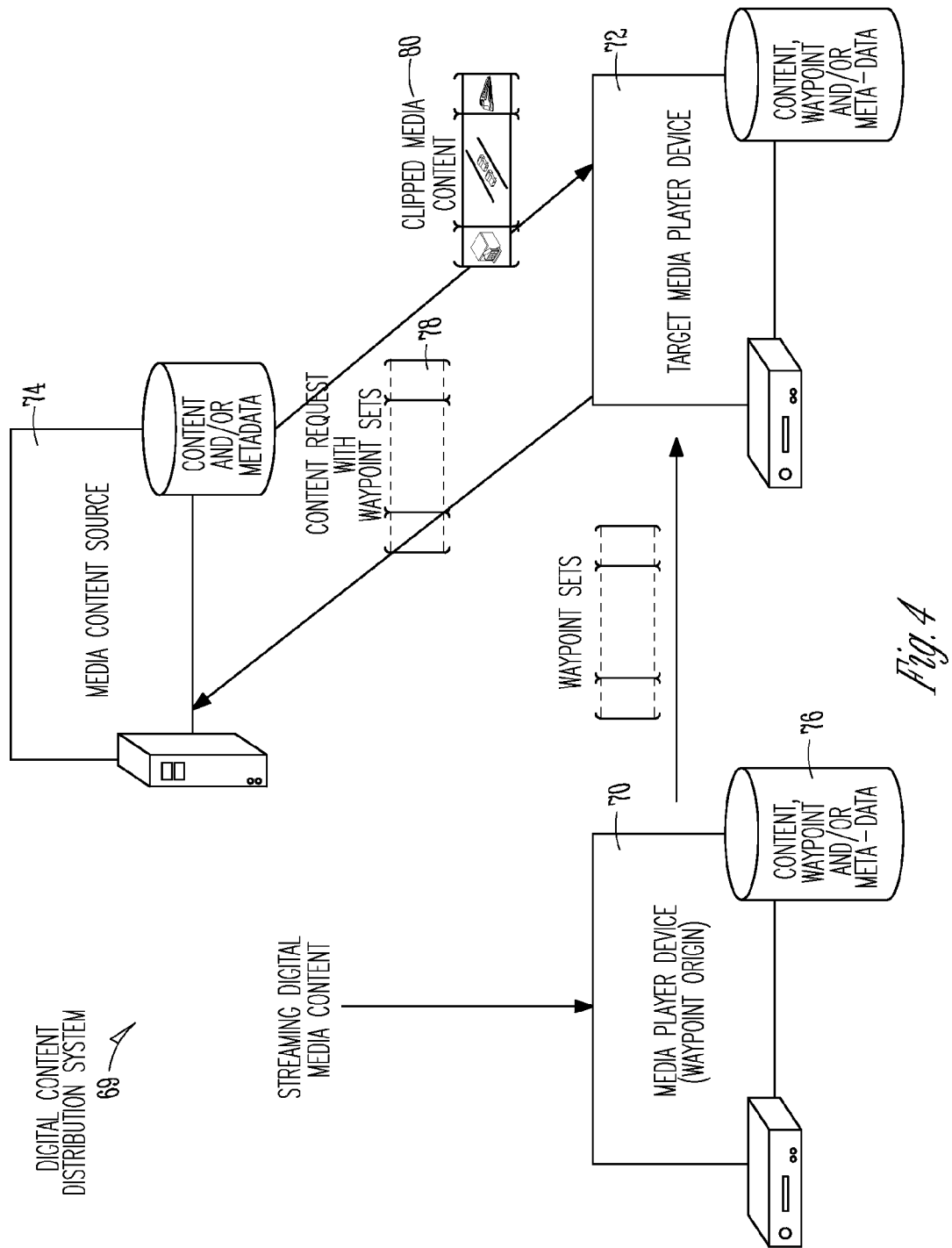
FIG. 4 illustrates an implementation of a digital content distribution system, according to an example embodiment.

FIG. 4 illustrates an implementation of a digital content distribution system 69, according to an example embodiment. As illustrated in FIG. 4, the digital content distribution system 69 includes a first media player device 70, a second (target) media player device 72 and a media content source 74. For purposes of this disclosure, a target media player device is simply a device that a user has selected for sharing one or more media clips.

In the example illustrated in FIG. 4, the first media player device 70 receives a stream of digital media content, and presents the digital media content to a user of the first device 70, which may be a set top box, a desktop computer, a laptop computer, a tablet computer, a mobile phone, a personal media player, or any other similar device for consuming digital content. In various example embodiments, the stream of digital media content may originate from any number and type of content sources. For instance, the content source may be a satellite broadcast, a cable broadcast, an audio or video on demand source, a computer network-based source, a local storage device, and so on. In any case, as the user of the first media player device listens to, and/or views the streaming digital content, the user causes pairs of waypoints to be generated. For instance, the user may press a button or buttons on a remote control device to generate the waypoint pairs. The media player device 70 includes storage 76, where the generated waypoints and corresponding meta-data are stored. For example, with some embodiments, as a user manipulates a control mechanism (e.g., a button) a waypoint processing module residing at the media player device will automatically generate the waypoint pairs and corresponding meta-data.

Subsequent to generating one or more pairs of waypoints and corresponding meta-data, the user may desire to share the media clips defined by the waypoints. Accordingly, the user may interact with a graphical user interface, facilitated by the media player device 70, which enables the user to select another user (e.g., target user), or another media player device (e.g., target device), to which the waypoint pair(s) are to be communicated. For example, the user may select a person from a buddy list populated with users that are part of a proprietary, or third party, social network. Alternatively, a user may simply enter an email address, telephone number, username, or some other identification means for identifying the person with whom the content is to be shared. Once a target user or target media player device has been selected or otherwise identified, the media player device 70 communicates the waypoint pair(s) to the target user or target device 72.

In some example embodiments, the target media player device may be a device similar to the media player device on which the waypoints are generated, to include, but not to be limited to: a set top box, a desktop computer, a laptop computer, a tablet computer, a mobile phone, a personal media player, or any other similar device for consuming digital content. When the target media player device 72 receives the waypoint pair(s) and corresponding meta-data, the waypoint pairs and the corresponding meta-data are processed and presented in a graphical user interface, enabling a user of the target media device to select the respective media clips for play back. For example, in some example embodiments, a title and/or short description of the media clips may be presented, for selection by a user. In some example embodiments, a thumbnail image and/or short preview may be available, allowing the receiving user to preview the media clip or clips prior to requesting the actual play back of the clip or clips. In some example embodiments, when the waypoint pair(s) and associated meta-data are received, the target media player automatically initiates a content request for the content. In some example embodiments, the content request is communicated to a default media content source 74. Alternatively, the content request may be communicated to a media content source 74 indicated in the waypoints and/or meta-data. Alternatively, the target media player device 72 may utilize a content source selection algorithm to select a content source from a variety of content sources. For instance, the target media player device 72 may have a locally stored copy of the content from which the media clips have been generated. In this case, the media clips can be generated and presented from the waypoint pair(s) without the need to request the content from a remote source. Accordingly, with some embodiments, the target media player device may first determine whether a local copy of the selection of digital media content is available from which the media clips can be generated. Only if a local copy is not available will the target media player request that the user select a content source, or alternatively, automatically request the content from a default content source.

As illustrated in FIG. 4, in some example embodiments, when the target media player device 72 communicates a content request 78 to the content source 74, the content request includes a copy of the waypoint pair or pairs that were initially communicated from the media player device 70 to the target media player device 72. As such, and as illustrated in FIG. 4, in some example embodiments the media content source 74 is capable of processing the waypoints included in a content request to generate the media clips defined by the waypoints, such that only the data representing the actual media clips (e.g., clipped media content 80) are communicated from the content source 74 to the target media player device 72. When the clipped media content 80 is received at the target media player device 72, it is stored for subsequent playback, or immediately presented (e.g., played back) to a user.

In some alternative example embodiments, the content request communicated from the target media player device 72 to the content source 74 will only include a content identifier identify the selection of digital media content from which the media clips are to be extracted. For instance, the waypoint pair or pairs that define the actual media clips may not be communicated to the media content source 74 in the content request. Accordingly, the content source 74 will communicate the entire selection of digital media content to the target media player device 72. If, for example, the selection of digital media content represents a movie, the entire movie is communicated from the content source 74 to the target media player device 72. When the target media player device 72 receives the media content, the target media player device 72 will process the media content and the waypoint pair(s) to generate the media clips defined by the waypoint pair(s). Once the media clips are generated, they are presented (e.g., played back) to the user.

Figure 5:
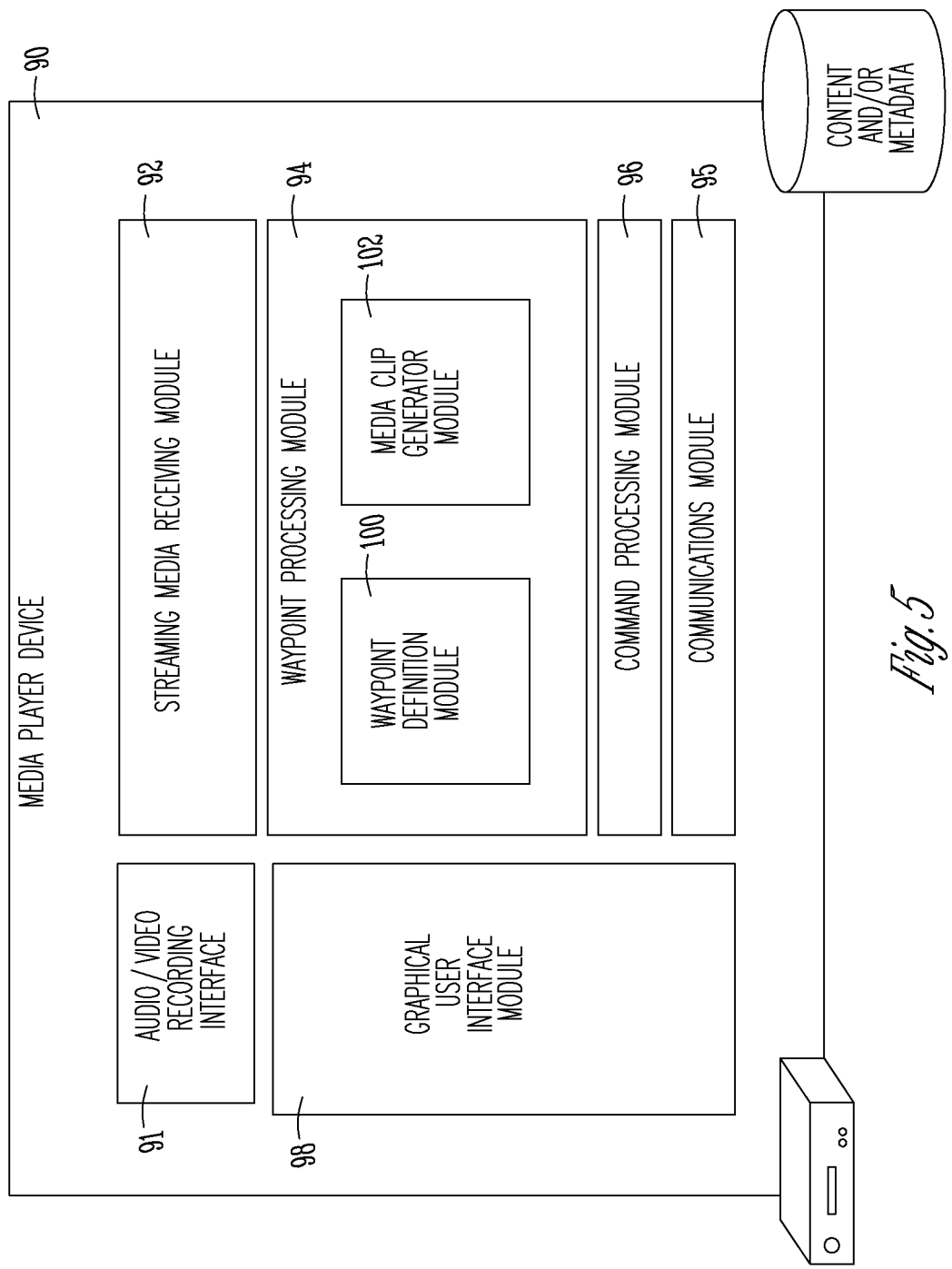
FIG. 5 illustrates an example functional block diagram of a media player device, according to an example embodiment.

FIG. 5 illustrates an example functional block diagram of a media player device 90, according to an example embodiment. As illustrated in FIG. 5, the media player device 90 is shown by way of example, and includes a streaming media receiving module 92, a waypoint processing module 94, a command processing module 96, and a graphical user interface module 98. In addition, the media player device includes an audio/video recording interface 91 and a communications module 95. The media player device 90 may be a set-top box, a personal computer (desktop, workstation, or mobile laptop), a personal media player, a mobile handset (e.g., smart phone), a tablet computing device, or similar device. Consistent with some example embodiments, the streaming media module 92 receives a stream of digital media content from a content source. In various example embodiments, the streaming media receiving module 92 may receive content from one or more sources selected from a wide variety of sources. For instance, the streaming media receiving module 92 may receive streaming media content from a conventional over-the-air television broadcast, a satellite broadcast, a data network (e.g., a conventional IP-based computer network, or mobile phone wide area network (WAN)). In some example embodiments, the source of the content may not be external, but may also be a fixed disk, or in some example embodiments, another machine readable medium, such as a DVD, Blu-Ray disc, Compact Disc, or flash memory device.

As illustrated in FIG. 5, the media player device 90 includes a waypoint processing module 94 that consists of a waypoint definition module 100 and a media clip generator module 102. In some example embodiments, the waypoint definition module 100 operates in conjunction with the command processing module 96 to generate the waypoints that define a media clip. For example, in some embodiments, the command processing module 96 receives a signal from a touch screen device (not shown), or a remote control device, directing the media player device 90 to generate a waypoint (either an in-point, or an out-point). When the command processing module 96 receives and processes such a command, the waypoint definition module 100 generates a waypoint that corresponds with the temporal position of the media content that is currently being presented by the media player device 90. In some example embodiments, the waypoint definition module 100 will analyze one or more data packets of the content that is being presented in order to identify the offset of the currently presented content in relation to the beginning of the selection of digital media content. Accordingly, in some example embodiments, the timing information that is included in a waypoint is derived based on an analysis of timing information present in the data packets comprising the streaming media content. However, in some example embodiments, the waypoint definition module 100 may include a timing mechanism to generate a timing offset. In such an implementation, the timing information included in the generated waypoints will be generated based on an analysis of timing information that is external to, or included in, the data packets comprising the selection of digital media content. In some embodiments, the analysis involved in generating waypoints may take into consideration the specific version of the digital media content that is being presented. For example, if a version of content is from a television broadcast, the timing analysis may compensate for television commercials, and so forth. In addition to analyzing, extracting and/or generating timing information for waypoints, the waypoint definition module 100 may also extract or generate certain meta-data that is either inserted into the waypoints, or stored separately in association with the generated waypoints.

In some example embodiments, the media clip generator module 102 reads existing waypoints, and corresponding meta-data, to generate media clips to be presented via the media player device 90. For example, in some embodiments, the media player device 90 may receive one or more waypoint pairs and associated meta-data from a remote media player device. The media clip generator module 102 processes received waypoint pairs and meta-data to generate the media clips defined by the waypoint pairs. In some embodiments, generating the media clips involves extracting from a selection of digital media content the particular portion of media content that is defined by the waypoints. In some alternative example embodiments, the media clips may be generated by a remote content source device, such as a web-based content source, or an audio or video on-demand source. Consistent with some embodiments, the graphical user interface element may display a selection of content sources from which a user is to choose or select a particular source. Accordingly, a content request will be directed to the selected source of content.

In some example embodiments, the media player device 90 has a graphical user interface module 98 that facilitates the presentation of one or more UI elements that enable a user to, in some cases, generate waypoints and select media clips for play back. For example, in some embodiments, a menu-driven GUI may present buttons on a touch screen device, enabling a user to press buttons presented on the touch screen device and generate waypoints defining media clips for content being displayed on the screen. Similarly, in some embodiments, the GUI may provide a mechanism for presenting several sets of media clips that have been received from various sources. For instance, when multiple persons have shared different media clips, the GUI provides a mechanism by which a user can select a particular media clip, or set of media clips, to be played back. In addition, the GUI may provide a host of other on-screen information, such as a channel selection function, volume selection function, content source selection, and content guide.

As shown in FIG. 5, the media player device 90 includes an audio/video recording interface 91, which may facilitate the recording of audio and/or video via an externally connected audio/video capturing device, such as a microphone, web camera, video camera, or similar device. In some example embodiments, the media player device may include an integrated, built-in audio/video recording device (now shown). The audio/video recording device (whether internal or external) may be used to capture a personal video message that may be communicated along with a waypoint pair, or set of waypoints, and associated meta-data. Accordingly, a user may record an introductory audio/video message explaining the significance of the various media clips that a user has shared. The user interface may facilitate the recording of such personal video messages.

The graphical user interface module 98 may also enable a user to concatenate various media clips (defined by waypoints) in an order determined by the user, and with transitions and special effects selected by the user. For example, a user may rearrange the order of several media clips by manipulating elements of the graphical user interface representing the various media clips defined by the waypoint pairs. Similarly, the user may select from a variety of pre-defined transition effects that will be presented at the transition point between any two media clips.

Skilled artisans will readily recognize that functions that have been attributed herein to certain modules may in fact be provided by different modules. Similarly, several of the modules and their respective functions as described herein may be combined in certain example embodiments, without departing from the scope and spirit of the invention. Moreover, a variety of additional modules that are not explicitly described in the context of the example presented in FIG. 5 may also be present in certain implementations of a media player consistent with example embodiments.

Figure 6:
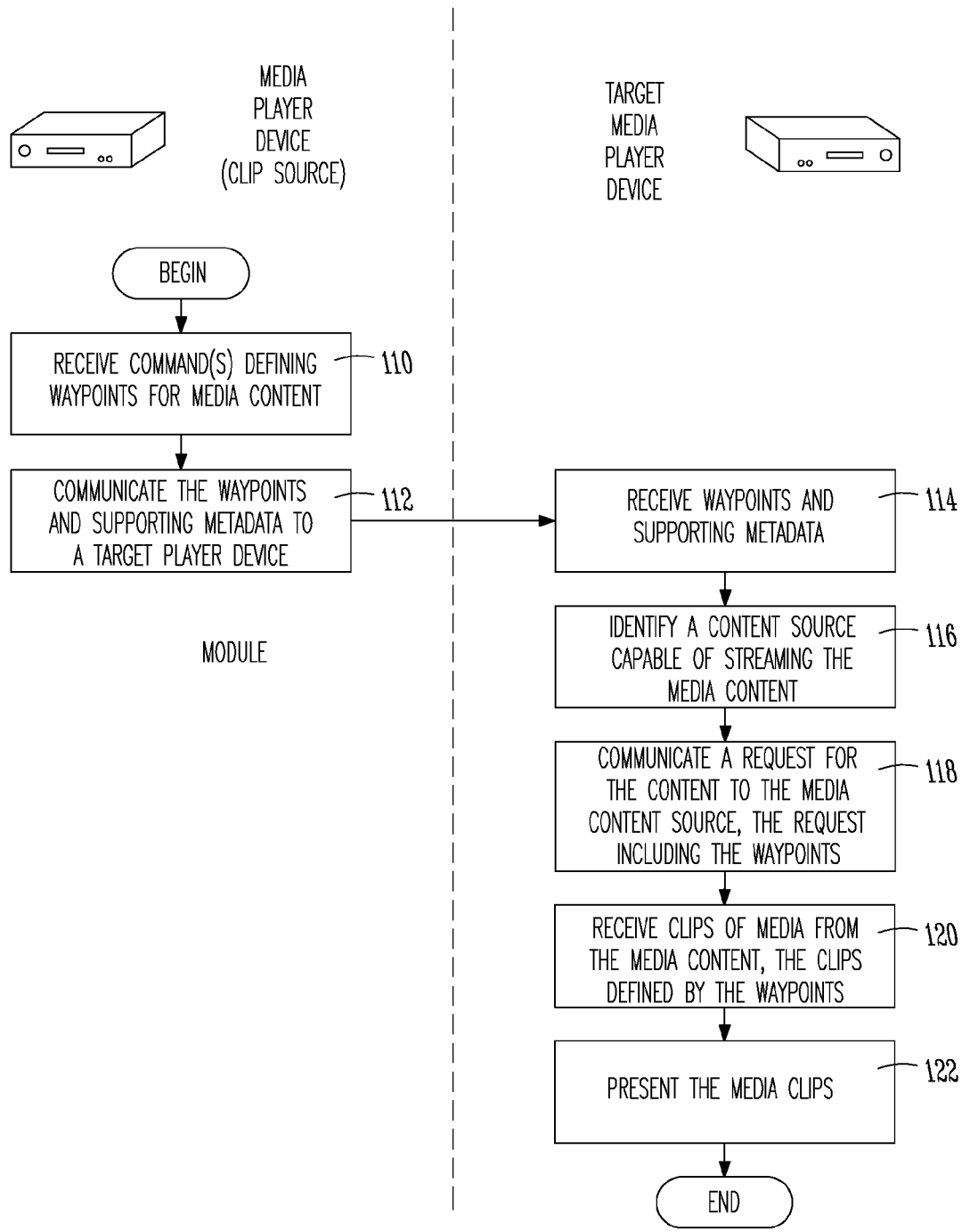
FIG. 6 illustrates an example method, according to an example embodiment, for sharing one or more media clips.

FIG. 6 illustrates an example method, according to an embodiment, for sharing one or more media clips. The method of FIG. 6 begins at method operation 110 when a command is received, directing a media player device to generate a waypoint. For example, method operation 110 will generally occur during the presentation of digital media content on a device to a user. The waypoint is generated to mark the point in the content being presented where a user would like to begin, or end, a media clip. As such, during the playback of the digital media content, a user may repeat method operation 110 a number of times to generate any number of waypoint pairs defining media clips. Furthermore, as described above, the particular input mechanism used to invoke the command to generate the waypoint may vary depending upon the particular media player device implementation. In some embodiments, a remote control device is used to signal a set top box to establish waypoints. However, in alternative embodiments, one or more control mechanisms integrated with the media player device (e.g., virtual buttons displayed on a touch screen display of a tablet computing device) may facilitate the invoking of commands for establishing waypoints.

Next, at method operation 112, the waypoint pair or pairs and corresponding meta-data that define the clip or clips generated in operation 110 are communicated from the media player device (at which they were generated) to another target media player device. In general, the communication of the waypoints and corresponding meta-data occurs responsive to receiving a user-generated command or directive requesting that the waypoints and meta-data be communicated to a particular person or device. As indicated above, the exact communication mechanism may vary depending upon the implementation. In some example embodiments, the communication of the waypoints and corresponding meta-data is over a computer-based network using conventional network protocols. In some example embodiments, the waypoints and corresponding meta-data might be emailed, or communicated via a messaging protocol (e.g., short messaging system (SMS)). In other example embodiments, the communication mechanism may involve a short range networking technology, such as Bluetooth, NFC, or infrared.

At method operation 114, the waypoints and corresponding meta-data are received at the target media player device. In some example embodiments, when the target media player device receives the waypoints and meta-data, the target media player device simply stores the waypoints, such that the media clip or clips defined by the waypoints can be presented as a selectable option by a user of the target media player. In such a scenario, the media clips may not be generated until a user has selected the media clips for presentation. In other example embodiments, the waypoints and meta-data may be pre-processed so as to pre-fetch any corresponding media clips, such that the media clips corresponding with the waypoints will be present in local storage at the target media player device when the user selects to play back the media clip or clips.

After the waypoints and corresponding meta-data have been received by the target media player device at method operation 114, at method operation 116 a content source containing the media content associated with the media clips is identified. For example, in the case of pre-fetching content, the target media player device may first assess whether the digital media content is locally accessible, and only if the digital media content is not locally accessible does the target media player attempt to access the digital media content from a remote source. With some embodiments, a content identifier will be sufficient to identify both the content source and content selection from which the media clips are to be generated. However, in some embodiments, a content source identifier may be utilized to determine the content source from which to request the content identified by the content identifier. In some example embodiments, a default content source is automatically selected. For example, the target media player may be associated with a proprietary content distribution system such that the target media player will always attempt to access content from the same content source. Alternatively, the waypoints and/or metadata may identify a content source where the content can be accessed. In some example embodiments, a content source selection algorithm might be used to select a particular content source from many available content sources. With some embodiments, when a user is prompted to select a content source from which to access the content, the user may be presented with pricing information indicating the cost associated with accessing the digital content. In some instances, the pricing information may reflect an amount tailored to the size of the data that is being requested, while in other instances, a flat fee may be requested regardless of the size of media clip being requested. In any case, after the content source is selected, at method operation 118 a content request is communicated to the selected content source.

As indicated in FIG. 6, in some example embodiments, the content request that is directed to the selected or identified content source includes the waypoints that were received by the target media player at method operation 114. In addition, the content identifier may be communicated to the content source. Accordingly, the content source receives the waypoints with the content request and processes the requested content to generate the media clips, based on the information included in the waypoints. In this manner, the content source need only serve or stream the data representing the actual media clips, and not the entire selection of digital content. Accordingly, at method operation 120, after communicating the content request, the target media player device receives the requested content—in this case, the media clips defined by the waypoints received at operation 114. Finally, at method operation 122, the target media player presents or plays back the media clips. If the retrieval of the media clips from the content source was part of a pre-fetch operation, then the media clips are presented at operation 122 in response to a user requesting the play back of the media clips. Alternatively, if the retrieval of the media clips was in response to a prior user request to play back the media clips, the media clips are presented at method operation 122 as they are received via the content source. In the case of video clips, the video clips will be presented in a display of, or attached to, the media player device. Similarly, in the case of audio clips, the audio clips will be played via a speaker attached to the target media player device.

In an alternative method for sharing media clips, the content request directed to the identified or selected content source does not include the waypoints received, for example, at method operation 114. Instead, the content request communicated from the target media player device to the content source simply identifies the selection of digital media content from which the media clips are to be generated. In response to receiving the content request, the content source serves the identified selection of digital media content. When the digital media content is received at the target media player device, the target media player device processes the received digital media content to generate the media clips based on the information in the waypoints. Once generated, the media clips can be immediately presented or stored until requested.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. Accordingly, the modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or as a service, for example, such as in the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Figure 7:
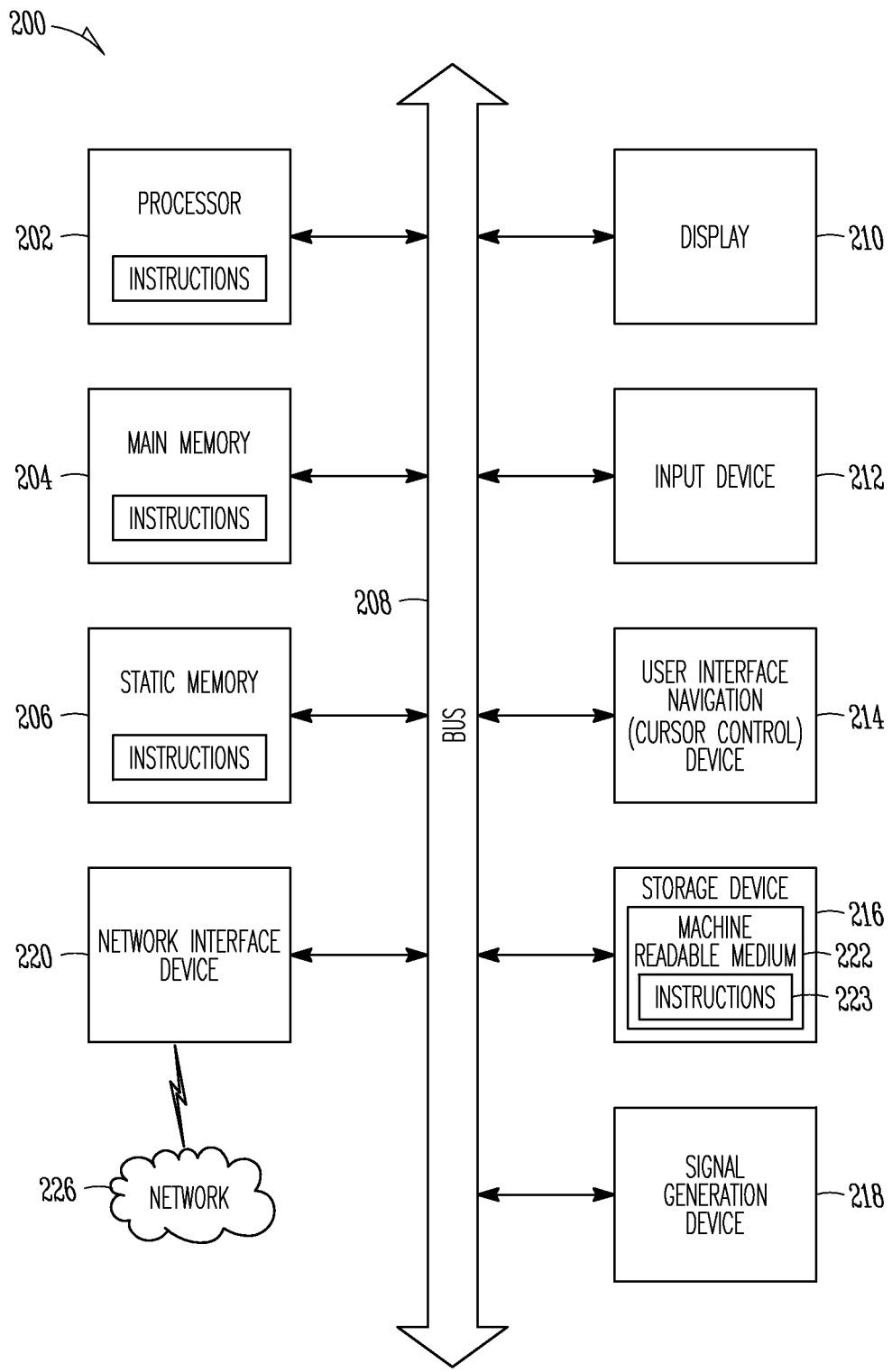
FIG. 7 is a block diagram of a machine in the form of a computer system (e.g., a media player device, or content source device) within which a set of instructions, for causing the machine to perform any one or more of the methodologies discussed herein, may be executed.

FIG. 7 is a block diagram of a machine in the form of a computer system within which a set of instructions, for causing the machine to perform any one or more of the methodologies discussed herein, may be executed. In some embodiments, the machine operates as a standalone device or may be connected (e.g., networked) to other machines. In a networked deployment, the machine may operate in the capacity of a server or a client machine in server-client network environments, or as a peer machine in peer-to-peer (or distributed) network environments. The machine may be a personal computer (PC), a tablet PC, a server, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 200 includes a processor 202 (e.g., a central processing unit (CPU), a graphics processing unit (GPU) or both), a main memory 201 and a static memory 206, which communicate with each other via a bus 208. The computer system 200 may further include a display unit 210, an alphanumeric input device (e.g., a keyboard), and a user interface (UI) navigation device 214 (e.g., a mouse). In one example embodiment, the display, input device and cursor control device are a touch screen display. The computer system 200 may additionally include a storage device (e.g., drive unit 216), a signal generation device 218 (e.g., a speaker), a network interface device 220, and one or more sensors, such as a global positioning system sensor, compass, accelerometer, or other sensor.

The drive unit 216 includes a machine-readable medium 222 on which is stored one or more sets of instructions and data structures (e.g., software 223) embodying or utilized by any one or more of the methodologies or functions described herein. The software 223 may also reside, completely or at least partially, within the main memory 201 and/or within the processor 202 during execution thereof by the computer system 200, the main memory 204 and the processor 202 also constituting machine-readable media.

While the machine-readable medium 222 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 223 may further be transmitted or received over a communications network 226 using a transmission medium via the network interface device 220 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Figure 8:
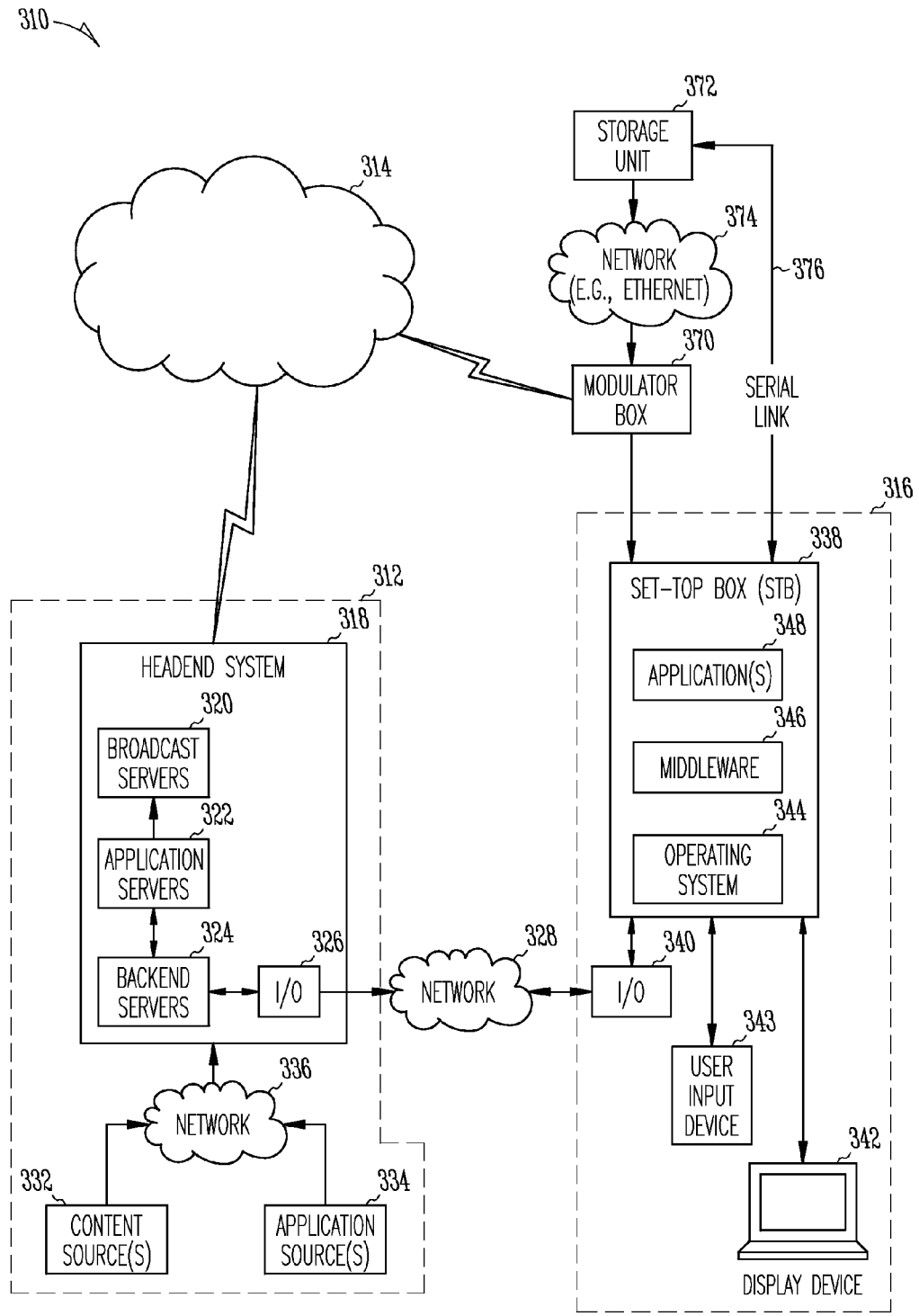
FIG. 8 is a diagrammatic representation of an example interactive television environment within which certain aspects of the inventive subject matter described herein may be deployed.

FIG. 8 is a diagrammatic representation of an example interactive television environment within which certain aspects of the inventive subject matter described herein may be deployed. The interactive television environment 310 includes a source system 312 that communicates data (e.g., digital media content selections, television content data and/or interactive application data) via a distribution network or system 314 and a modulator box 370 to a receiver system 316. Consistent with some example embodiments, the source system 312 may process waypoints received from a media player device, to select and concatenate media clips for communication to and presentation on another media player device. In one example embodiment, the interactive television environment 310 optionally includes a storage unit 372 (e.g., personal computer) that communicates stored data via a network 374 to the modulator box 370 which, in turn, communicates the stored data, television content data, and interactive application data to the receiver system 316. The modulator box 370, storage unit 372, and the receiver system 316 are typically co-located in a subscriber's home. Thus, in one example embodiment, the modulator box 370 may combine television content data and interactive application data received from the remote source system 312 with local stored data provided by the storage unit 372 provided at the subscriber's home.

Turning first to the source system 312, an example headend system 318 operates to communicate the data as a broadcast transmission. To this end, the headend system 318 is shown to include one or more broadcast servers 320 and, optionally, one or more application servers 322. Each of the broadcast servers 320 may operate to receive, encode, packetize, multiplex, modulate, and broadcast data from various sources and of various types. While the example embodiment is described herein as transmitting data from the headend system 318 as a broadcast, it will be appreciated that the relevant data could also be unicast or multicast from the source system 312 via the distribution system 314 and modulator box 370 to the receiver system 316. In various embodiments, data could also be transmitted from the source system 312 via a network connection to the receiver system 316. Consistent with some embodiments, content may be received via a cable network, satellite broadcast network, or data network (e.g., such as the Internet), or a combination of these. Further details regarding an example broadcast server 320 are provided below with reference to FIG. 9.

Each application server 322 may compile and provide interactive data modules to the broadcast server 320. The interactive data modules may also include data that are utilized by an interactive television application. An application server 322 may also include multiplexing functionality to enable multiplexing of, for example, interactive television applications and associated data with audio and video signals received from various sources. An application server 322 may also have the capability to feed (e.g., stream) multiple interactive television applications to one or more broadcast servers 320 for distribution to the receiver system 316. To this end, each application server 322 may implement a so-called "carousel," whereby code and data modules are provided to a broadcast server 320 in a cyclic, repetitive manner for inclusion within a transmission from the headend system 318.

The headend system 318 is also shown by way of example to include one or more backend servers 324, which are coupled to the application servers 322 and to a modem pool 326. Specifically, the modem pool 326 is coupled to receive data from the receiver systems 316 via a network 328 (e.g., the Internet) and to provide this data to backend servers 324. The backend servers 324 may then provide the data, received from the receiver system 316, to the application servers 322 and the broadcast servers 320. Accordingly, the network 328 and the modem pool 326 may operate as a return channel whereby a receiver system 316 is provided with interactivity with the source system 312. Data provided to the headend system 318 via the return channel may include, merely for example, user input to an interactive television application executed at the receiver system 316 or data that is generated by the receiver system 316 and communicated to the source system 312. The return channel 330 may also provide a channel whereby programs, targeted advertisements/commercials, and applications from the source system 312 are provided to the receiver system 316.

Within the source system 312, the headend system 318 is also shown optionally to receive data (e.g., content, code, and application data) from external sources. For example, FIG. 8 illustrates the headend system 318 as being coupled to one or more content sources 332 and one or more application sources 334 via a network 336 (e.g., the Internet). For example, a content source 332 could be a provider of entertainment content (e.g., movies), a provider of real-time dynamic data (e.g., weather information), a plurality of targeted advertisements, prime time viewing advertisements, or the like. An application source 334 may be a provider of any interactive television application. For example, one or more application sources 34 may provide a TV Media Player Application, Electronic Program Guide (EPG) and navigation applications, messaging and communication applications, information applications, sports applications, or games and gaming applications.

Turning now to the example distribution system 314, the distribution system 314 may, in one embodiment, support the broadcast distribution of data from the source system 312 to the receiver system 316. As shown, the distribution network or system 314 may comprise a satellite, cable, terrestrial, or Digital Subscriber Line (DSL) network, or any other data communication network or combination of such networks.

The receiver system 316 is shown, in one example embodiment, to include a set-top box (STB) 338 that receives data via the distribution system 310 and modulator box 370, and a modem 340 for return channel communications with the headend system 318. The receiver system 316 is also shown to include other optional external systems such as a user input device 343 (e.g., a keyboard, remote control, mouse, etc.) and a display device 342, coupled to the set-top box 338, for the display of content received at the set-top box 338. In one example embodiment, the display device 342 may be a television set.

The set-top box 338 may execute three layers of software, namely an operating system 344, middleware 346 and, optionally, one or more interactive television applications 348. The middleware 346 may operate to shield the interactive television application 348 from differences of various operating systems 544 and differences in hardware of different varieties of the set-top box 338. To this end, the middleware 346 may provide driver Application Program Interfaces (APIs) and a library to translate instructions received from an interactive television or stored data application 48 into low-level commands that may be understood by set-top box hardware (e.g., modems, interface ports, smart card readers, etc.).

The modulator box 370, in one example embodiment, receives stored data 598 (see FIG. 9, below) from the storage unit 372 and a broadcast transmission from the source system 312. The modulator box 370 multiplexes the stored data 398 into the broadcast transmission thereby generating a second transmission that is communicated to the receiving system 316. It will however be appreciated that storage unit functionality is optional. The storage unit 372 may store data and, upon request, communicate the stored data to the modulator box 370 over the network 374 (e.g., Ethernet). The storage unit 372 may communicate the stored data in response to commands that are entered by a user from the set-top box 338 and communicated to the storage unit 372 over the link 376.

Figure 9:
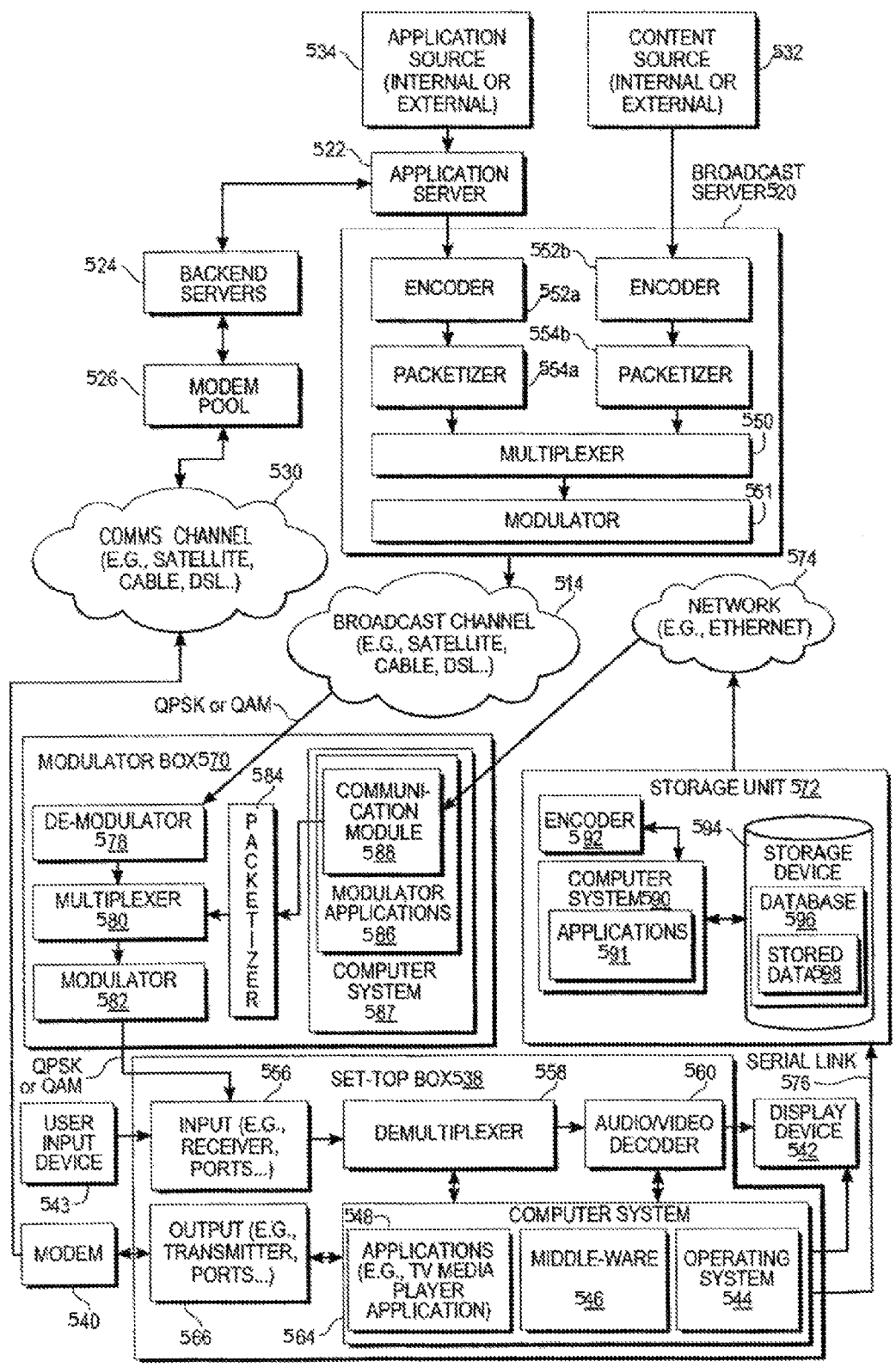
FIG. 9 is a block diagram providing architectural details regarding a broadcast server, a modulator box, a set-top box and an optional storage device according to an example embodiment.

FIG. 9 is a block diagram providing architectural details regarding a broadcast server, a modulator box, a set-top box and an optional storage device according to an example embodiment of the inventive subject matter. Specifically, FIG. 9 shows a broadcast server 520, which may support a carousel of modules, as including a number of parallel paths that provide input to a multiplexer 550, each of the parallel paths including an encoder 552 and a packetizer 554. Each encoder 552 may operate to receive input from one or more sources. For example, the encoder 552a is shown to receive streamed application modules from the application server 522 that, in turn, is coupled to receive application data from one or more application sources 354. The application source 34 may be internal or external to a headend system 18. Similarly, an encoder 552b is shown coupled to receive content data from one or more content sources 532, which may again be internal or external to the headend system 518.

A skilled artisan will appreciate that each broadcast server 20 may include any number of parallel paths coupled to any number of sources (e.g., application or content sources 534 and 532) that provide input to the multiplexer 550. Furthermore, a headend system 518 may deploy any number of broadcast servers 520.

Each of the encoders 552 operates to encode data utilizing any one or more of a number of compression algorithms, such as, for example, the Motion Picture Expert Group (MPEG) compression algorithms. Each of the encoders 552 may also operate to time stamp data for synchronization purposes. A skilled artisan will further understand that certain data types may not be susceptible to encoding and may thus pass through, or by-pass, the encoder 552, and be provided to a packetizer 554 in an unencoded state. In one example embodiment, the packetizers 554 may be coupled to receive both encoded and unencoded data and to format these data into packets before eventual transmission via the distribution system 514 (e.g., a broadcast channel).

Each of the packetizers 554 provides packets to the multiplexer 550, which multiplexes the packets into a transmission that is modulated by a modulator 551. The modulator 551 may utilize a modulation technique prior to distribution of broadcast transmission via the distribution system 514. For example, the modulator 551 may utilize a quadrature phase shift keying (QPSK) modulation technique, which is a digital frequency modulation technique that is used for communicating data over coaxial cable networking facilities or a quadrature amplitude (QAM) modulation technique, which is a digital amplitude modulation technique that is used for communicating data over wireless networking facilities.

The modulator box 570, in one example embodiment, includes a demodulator 578, a multiplexer 580, a modulator 582, a packetizer 584, and a computer system 587. The demodulator 578 receives and demodulates the broadcast transmission that, in turn, is communicated to the multiplexer 580 that, in turn, is communicated to the modulator 582 that modulates, utilizing a modulation technique as described above, and communicates a transmission to the set-top box 538. The computer system 587 may execute modulator applications 586 that include a communication module 588. The communication module 588 may receive data modules from the storage unit 572, the data modules including stored data 598 in the form of application data and content data. The application data include executable applications that may be executed by a computer system 564 on the set-top box 538. The content data include alphanumeric, image, and video and audio data that may be displayed on the display device 542 connected to the set-top box 538. The packetizer 584 packetizes the data modules into packets and communicates the packets to the multiplexer 580 that multiplexes the stream of packets that contain stored data 598 together with the multiple streams of packets in the broadcast transmission to form a plurality of streams in the example form of a transmission.

The storage unit 572 (e.g., a personal computer) includes a computer system 590, a storage device 594, and an encoder 592. The computer system 590 may execute applications 591 (e.g., an operating system, word processing, etc.) that may include a Storage Device Media Player Application that receives and processes commands that are entered by a user operating the set-top box 538. The Storage Device Media Player application may receive a command from a user that requests stored data 598 in the example form of a file that resides on a database 96 on the storage device 594. Responsive to receipt of the command, the Storage Device Media Player Application may direct the storage unit 572 to communicate the requested file in the form of data module(s) to the modulator box 570 that, in turn, communicates the data module(s) to the set-top box 538. The encoder 592 operates to encode data utilizing any one or more of a number of compression algorithms, such as, for example, the Motion Picture Expert Group (MPEG) compression algorithms. The encoder 592 may also operate to time stamp data for synchronization purposes. It will be appreciated that certain data types may not be susceptible to encoding and may thus pass through, or by-pass, the encoder 592, and be provided to a modulator box 570 in an unencoded state.

The set-top box 538 of the example receiver system 16 may be coupled to a multiplexer box 570 that is coupled to a network input (e.g., a modem), cable input, satellite dish, or antenna so as to receive the broadcast transmission, transmitted from the headend system 518 via the distribution system 514. The broadcast transmission may be fed to the modulator box 70 that produces a transmission that is then fed to an input 556 (e.g., a receiver, port, etc.) on the set-top box 538. Where the input 556 comprises a receiver, the input 556 may, for example, include a tuner (not shown) that operates to select a channel on which the transmission is communicated. The packetized transmission is then fed from the input 556 to a demultiplexer 558 that demultiplexes the application and content data that constitute the transmission signal. For example, the demultiplexer 558 may provide the content data to an audio and video decoder 560, and the application data to a computer system 564. The audio and video decoder 560 decodes the content data into, for example, a television signal. For example, the audio and video decoder 560 may decode the received content data into a suitable television signal such as an NTSC, PAL, or HDTV signal. The television signal is then provided from the audio and video decoder 560 to the display device 542.

The computer system 564, which may include a processor and memory, that reconstructs one or more interactive television applications (e.g., originating from the source system 512) and one or more stored data applications (e.g., originating from the storage unit 572) from the application data that is provided to it by the demultiplexer 558. The application data may include both application code or application information that is used by an application 48. The computer system 564, in addition to reconstructing an application 548, executes such an application 548 to cause the set-top box 538 to perform one or more operations. For example, the computer system 564 may output a signal to the display device 542. For example, this signal from the computer system 564 may constitute an image or graphical user interface (GUI) to be overlaid on an image produced as a result of the signal provided to the display device 542 from the audio and video decoder 560. The user input device 543 (e.g., a keyboard, remote control, mouse, microphone, camera, etc.) is also shown to be coupled to the input 556, so as to enable a user to provide input to the set-top box 538. Such input may, for example, be alphanumeric, audio, video, or control (e.g., manipulation of objects presented in a user interface) input.

The computer system 64 is also shown to be coupled to the audio and video decoder 560 so as to enable the computer system 564 to control this decoder 560. The computer system 564 may also receive an audio or video signal from the decoder 560 and combine this signal with generated signals so as to enable the computer system 564 to provide a combined signal to the display device 542.

The computer system 564 is also shown, by way of example, to be coupled to an output 566 (e.g., a transmitter, output port, etc.) through which the set-top box 538 is able to provide output data, via the return channel 530, to an external system, such as for example, the headend system 518. To this end, the output 566 is shown to be coupled to the modem 540 of the receiver system 516.

While the receiver system 516 is shown in FIGS. 8 and 9 to comprise a set-top box 538 coupled to a display device 542, the components of the receiver system 516 could be combined into a single device (e.g., a computer system), or could be distributed among a number of independent systems. For example, a separate receiver system 516 may provide input to a set-top box 538, which is then coupled to a display device 542.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the included claims, along with the full range of equivalents to which such claims are entitled.

What is claimed is:

1. A method comprising:

at a first media player device operated by a first user, defining a first waypoint pair and a second waypoint pair for a piece of content, the first and second waypoint pairs each comprising a first waypoint defining a beginning point of a corresponding media clip and a second waypoint defining an ending point of the corresponding media clip, each media clip being a different portion of the same piece of content;

generating, with a camera of the first media player device, a video message that includes newly captured audio that annotates the two media clips defined by the first and second waypoint pairs for the piece of content;

identifying a second user by accessing a list of social network contacts from a social network account of the first user; and generating a transmission from the first media player device to a second media player device associated with the second user, the transmission from the first media player device to the second media player device including the video message that includes the captured audio that annotates the two media clips defined by the first and second waypoint pairs for the piece of content, the first and second waypoint pairs, a content identifier for the piece of content, and metadata indicating that the two media clips defined by the first and second waypoint pairs should be caused to be concatenated by the second media player device, the second media player device being caused to generate, based on data in the metadata, a thumbnail image as a graphical representation of the concatenated media clips in a user interface of the second media device.

2. The method of claim 1, wherein the content identifier further indicates a plurality of content sources from which the piece of content can be requested by the second media player device.

3. The method of claim 2, wherein the plurality of content sources from which the piece of content can be requested include content sources capable of performing the concatenation after receiving the first and second waypoint pairs from the second media player device.

4. The method of claim 1, wherein the transmission further includes an identification of the first user.

5. The method of claim 1, further comprising capturing an audio file with an audio capturing device on the first media player device, the audio file describing the media clips defined by the first and second waypoint pairs.

6. The method of claim 2, wherein the identifying of the second user identifies multiple second users that are part of a social network.

7. The method of claim 1, wherein the identifying the second user includes identifying a group of one or more server computers as the second media player device; and wherein the generating of the transmission to the second media player device generates the transmission to the group of one or more server computers.

8. A first media player device comprising:

a memory; and at least one processor configured to:

define a first waypoint pair and a second waypoint pair for a piece of content, the first and second waypoint pairs each comprising a first waypoint defining a beginning point of a corresponding media clip and a second waypoint defining an ending point of the corresponding media clip, each media clip being a different portion of the same piece of content;

generate, with a camera of the first media player device, a video message that includes newly captured audio that annotates the two media clips defined by the first and second waypoint pairs for the piece of content;

identify a second user by accessing a list of social network contacts from a social network account of a first user; and generate a transmission from the first media player device to a second media player device associated with the second user, the transmission from the first media player device to the second media player device including the video message that includes the captured audio that annotates the two media clips defined by the first and second waypoint pairs for the piece of content, the first and second waypoint pairs, a content identifier for the piece of content, and metadata indicating that the two media clips defined by the first and second waypoint pairs should be caused to be concatenated by the second media player device, the second media player device being caused to generate, based on data in the metadata, a thumbnail image as a graphical representation of the concatenated media clips in a user interface of the second media device.

9. The first media player device of claim 8, wherein the content identifier further indicates a plurality of content sources from which the piece of content can be requested by the second media player device.

10. The first media player device of claim 8, wherein the plurality of content sources from which the piece of content can be requested include content sources capable of performing the concatenation after receiving the first and second waypoint pairs from the second media player device.

11. The first media player device of claim 8, wherein the transmission further includes an identification of the first user.

12. The first media player device of claim 8, further comprising capturing an audio file with an audio capturing device on the first media player device, the audio file describing the media clips defined by the first and second waypoint pairs.

13. A non-transitory machine-readable storage medium comprising a set of instructions which, when executed by at least one processor, causes execution of operations comprising:

at a first media player device operated by a first user, defining a first waypoint pair and a second waypoint pair for a piece of content, the first and second waypoint pairs each comprising a first waypoint defining a beginning point of a corresponding media clip and a second waypoint defining an ending point of the corresponding media clip, each media clip being a different portion of the same piece of content;

generating, with a camera of the first media player device, a video message that includes newly captured audio that annotates the two media clips defined by the first and second waypoint pairs for the piece of content;

identifying a second user by accessing a list of social network contacts from a social network account of the first user; and generating a transmission from the first media player device to a second media player device associated with the second user, the transmission from the first media player device to the second media player device including the video message that includes the captured audio that annotates the two media clips defined by the first and second waypoint pairs for the piece of content, the first and second waypoint pairs, a content identifier for the piece of content, and metadata indicating that the two media clips defined by the first and second waypoint pairs should be caused to be concatenated by the second media player device, the second media player device being caused to generate, based on data in the metadata, a thumbnail image as a graphical representation of the concatenated media clips in a user interface of the second media device.

14. The non-transitory machine-readable storage medium of claim 13, wherein the content identifier further indicates a plurality of content sources from which the piece of content can be requested by the second media player device.

15. The non-transitory machine-readable storage medium of claim 14, wherein the plurality of content sources from which the piece of content can be requested include content sources capable of performing the concatenation after receiving the first and second waypoint pairs from the second media player device.

16. The non-transitory machine-readable storage medium of claim 13, wherein the transmission further includes an identification of the first user.

\* \* \* \* \*